Patented June 19, 1934

1,963,374

UNITED STATES PATENT OFFICE 1,963,374

PRODUCTION OF QUINOLINE YELLOW BASES

James Ogilvie, Buffalo, N. Y., assignor to National Aniline & Chemical Company, Inc., New York, N. Y., a corporation of New York No Drawing. Application April 30, 1929, Serial No. 359,432

29 Claims. (Cl. 260—40)

The present invention relates to the production of phthalones of the quinophthalone type, and particularly to the production of quinoline yellow base (quinophthalone).

The production of phthalones of the quinophthalone type by condensation of an o-phthalic anhydride (o-phthalic anhydride or a nuclear substituted derivative thereof) with a compound containing the picoline nucleus, and more particularly with a quinaldine (quinaldine or a nuclear substituted derivative thereof), with or without the aid of a condensing agent, e. g., zinc chloride, is well known. In this reaction difficulty is experienced in maintaining the reaction mass fluid during the condensation. In order to maintain the mass in the fluid state it is necessary to increase the temperature as the water, produced in the reaction, is evolved. The increased temperature tends to increase the formation of by-products, and thus lower the yield of color base in the condensation. The by-products formed in the reaction are difficult to remove in or after the subsequent sulfonation of the color base for the production of quinoline yellow (water soluble), and if present, serve to contaminate the sulfonated base and render the dye unsuitable for lakes.

Heretofore, the reaction could not be carried out to advantage by the use of temperatures below the fusion point of the reaction mass, for the mass sets and becomes impossible to stir. Stirring is necessary to avoid local overheating and secure a ready transfer of heat through the reaction mass. Therefore, the temperature maintained must be high enough throughout the reaction to keep the mass fluid at all times. Since water is eliminated in the condensation and boils off as the reaction proceeds, thereby raising the melting point of the mass, it is necessary to increase the temperature as the reaction proceeds.

According to the present invention, the production of phthalones of the quinophthalone type by the condensation of an o-phthalic anhydride with a compound containing the picoline nucleus (for example, picoline, quinaldine, chlorquinaldine, benzoquinaldine, etc.) is carried out in the presence of an inert organic liquid, preferably one having a high boiling point, as a diluent. The expression "liquid as a diluent", as employed herein, denotes liquids which dilute the reaction mixture whether or not said liquids serve in addition as solvents for the reacting ingredients and/or the products. I have found that when employing an inert organic liquid as a diluent in the reaction, the employment of a condensing agent is ordinarily not necessary, although of course a condensing agent may be used if desired. Preferably, the amount of inert liquid employed as a solvent or as a diluent is just sufficient, or in slight excess of that sufficient, to maintain in solution the phthalone produced in the condensation, i. e., an amount of liquid which will just or barely prevent the reaction mixture from solidifying or partially solidifying while carrying out the condensation. While larger amounts of the inert liquid may be used, the yield of phthalone tends to decrease with increase in the amount of inert liquid employed above that which forms, or nearly forms, a saturated solution of the phthalone at the temperature employed in carrying out the condensation. By the employment of a suitable organic liquid as the diluent, the water present or formed in the reaction can be readily distilled off, the reaction mass can be readily stirred, and the condensation can be carried out with avoidance of local over-heating, thereby reducing the quantity of by-products such as isophthalones formed in the condensation and increasing the yield of phthalones.

The organic liquid employed as a diluent should be inert, under the conditions of the condensation, to the reacting ingredients and to the products of the reaction. Preferably, at the temperature of the reaction it should be a solvent for the phthalone produced. It is also preferable that when cold, it should be a solvent for the impurities and by-products produced in the reaction such as isophthalones, but should not be a good solvent for the phthalones.

By the use in the condensation of an organic liquid possessing these properties, the phthalone will crystallize on cooling from the organic liquid. I have found that an organic liquid having these properties also may be used advantageously for the purification of an impure phthalone made according to the method of the prior art. By heating the prior art product with the necessary amount of organic liquid until all of it is dissolved, then cooling and crystallizing out the phthalone, a purification is effected. The phthalone obtained in this way is ordinarily not so pure as that obtained when the organic liquid is used as a diluent in the condensation.

Since water is liberated in the reaction, it is desirable to use an organic liquid immiscible with water as a diluent. The organic liquid will then require very little or no drying to prepare it for reuse in the process. It is also preferable to employ an organic liquid which can be distilled with steam, for thereby the recovery of the solvent is simplified.

It is not essential that the boiling point of the organic liquid employed should be as high as the temperature at which the reaction is carried out for its boiling point is raised by dissolution therein of the reaction ingredients. By the term "an organic liquid of high boiling point" is meant an organic liquid having a boiling point so high, e. g., 160° to 190° C. and above, that it may be used in the condensation without pressure to secure the desired temperature. A chlorbenzol, such as "Solvent 74" or "Solvent 75" (i. e., commercial o-dichlorbenzol), nitrobenzene, and p-cymene may be mentioned as examples of suitable liquids of high boiling point.

The invention will be further illustrated by the following example.

*Example.*—Into a kettle equipped with an agitator, a Liebig condenser and means for heating its contents, and with the agitator running, charge 675 lbs. quinaldine, 675 lbs. commercial o-dichlorbenzol ("Solvent 75", b. p. 179°–184° C.) and 810 lbs. phthalic anhydride. The temperature of the charge, which is substantially a homogeneous solution, is then increased to 183–4° C. where it is maintained for 10 hours. The solvent is permitted to distil off, carrying with it the water which is formed in the reaction, and additional preheated solvent (heated to about 80°–125° C.) is added from time to time to replace that which distils off. Agitation is continued throughout the reaction. After completion of the condensation, as indicated by the cessation of the distillation of water, 940 parts additional preheated solvent is added to dilute the reaction mixture while the temperature is maintained at 178°–184° C. The purpose of this additional solvent is to prevent too rapid crystallization of the material during handling of the batch.

The batch is then emptied into a crystallizing tank containing 1000 lbs. of Solvent 75, where it is agitated and cooled to a temperature of about 30° C. The quinoline yellow base which crystallizes out is then filtered off, and washed with cold "Solvent 75", followed by washing with 2700 lbs. denatured alcohol. The filter cake is dried at 120°–130° C. It is of a bright yellow color, and is of high purity. The yield is excellent.

In the above example, the amount of dichlorbenzene employed during the condensation is in slight excess of that required to maintain the quinoline yellow base in solution. The dichlorbenzene may be replaced by corresponding quantities of nitrobenzene, or p-cymene, or other high boiling organic liquids. The condensation may be effected at sub-normal, normal or super-normal pressures, if desired.

The organic liquid used as a diluent, and the alcohol used in washing, may be recovered for reuse by distillation. By suitable apparatus, the organic liquid which distils off during the condensation may be automaticaly dried, condensed, warmed and returned to the reaction mass.

The temperature to be employed in the condensation will depend, among other conditions, upon the nature of the reacting ingredients. But, in general, it may be stated that temperatures between 160° and 195° C. may be employed.

In the above examples, the phthalic anhydride may be replaced by a corresponding weight of another o-phthalic anhydride, as for example tetrachlorphthalic anhydride or another nuclear substituted derivative of o-phthalic anhydride wherein the substituent atoms or groups take no active part in the condensation reaction. Also the quinaldine may be replaced by a corresponding weight of another compound containing the picoline nucleus, as for example, picoline, benzoquinaldine, chlorquinaldine, methylquinaldine, etc. (defined generically in the claims as "a member of the class consisting of the picolines and the quinaldines"), for the production of other phthalones of the quinophthalone type.

I claim:

1. In the production of a phthalone by the condensation of an o-phthalic anhydride with a member of the group consisting of the picolines and the quinaldines, the improvement which comprises carrying out the condensation in a reaction mixture containing an inert organic liquid as a diluent.

2. In the production of a phthalone by the condensation of an o-phthalic anhydride with a member of the group consisting of the picolines and the quinaldines, the improvement which comprises carrying out the condensation in a reaction mixture containing an inert organic liquid of high boiling point as a diluent, said liquid when hot being a solvent for the phthalone.

3. In the production of a phthalone by the condensation of an o-phthalic anhydride with a member of the group consisting of the picolines and the quinaldines, the improvement which comprises carrying out the condensation in a reaction mixture containing an inert organic liquid of high boiling point as a diluent, the quantity of liquid employed being such as to prevent solidification of the mass at the temperature of the reaction.

4. In the production of a phthalone by the condensation of an o-phthalic anhydride with a member of the group consisting of the picolines and the quanaldines, the improvement which comprises carrying out the condensation in a reaction mixture containing an inert organic liquid as a diluent, said liquid when cold being a relatively good solvent for the by-products of the condensation but not for the phthalone.

5. In the production of a phthalone by the condensation of an o-phthalic anhydride with a member of the group consisting of the picolines and the quinaldines, the improvement which comprises carrying out the condensation in a reaction mixture containing an inert organic liquid of high boiling point as a diluent, the quantity of liquid employed being such as to prevent solidification of the mass at the temperature of the reaction, and cooling the reaction mass to separate out the phthalone.

6. In the production of a phthalone by the condensation of an o-phthalic anhydride with a member of the group consisting of the picolines and the quinaldines, the improvement which comprises carrying out the condensation at a temperature below the fusion point of the mixed reacting ingredients and in a reaction mixture containing an inert organic liquid of high boiling point as a diluent, said liquid being a solvent for the phthalone at the temperature of the reaction and the quantity of liquid employed being such as to barely prevent solidification of the mass at the temperature of the reaction, diluting the reaction mass with additional liquid at the conclusion of the reaction and cooling to separate out the phthalone.

7. In the production of a phthalone of the quinophthalone series by the condensation of phthalic anhydride with a member of the quinaldine series, the improvement which comprises carrying out the condensation in a reaction mixture containing an inert organic liquid as a diluent.

8. In the production of a phthalone of the quinophthalone series by the condensation of an o-phthalic anhydride with a member of the quinaldine series, the improvement which comprises removing water formed by the condensation reaction from the reaction mixture by distillation jointly with a water-immiscible inert organic liquid.

9. In the production of a phthalone by the condensation of an o-phthalic anhydride with a member of the group consisting of the picolines and the quinaldines, the improvement which comprises carrying out the condensation in a reaction mixture containing a chlorbenzol as a diluent.

10. In the production of a phthalone of the quinophthalone series by the condensation of an o-phthalic anhydride with a member of the quinaldine series, the improvement which comprises carrying out the condensation in a reaction mixture containing o-dichlorbenzol as a diluent.

11. In the production of a phthalone of the quinophthalone series by the condensation of an o-phthalic anhydride with a quinaldine, the improvement which comprises carrying out the condensation in a reaction mixture containing an inert organic liquid of high boiling point as a diluent, said liquid when hot being a solvent for the phthalone, and when cold being a solvent for the by-products of the condensation but not for the phthalone.

12. In the production of a phthalone of the quinophthalone series by the condensation of an o-phthalic anhydride with a quinaldine, the improvement which comprises carrying out the condensation in a reaction mixture containing an inert organic liquid of high boiling point as a diluent, the quantity of liquid employed being such as to prevent solidification of the mass at the temperature of the reaction.

13. In the production of a phthalone of the quinophthalone series by the condensation of an o-phthalic anhydride with a quinaldine, the improvement which comprises carrying out the condensation in a reaction mixture containing an inert organic liquid of high boiling point as a diluent, the quantity of liquid employed being such as to prevent solidification of the mass at the temperature of the reaction, and cooling to separate out the phthalone.

14. In the production of a phthalone of the quinophthalone series by the condensation of an o-phthalic anhydride with a quinaldine, the improvement which comprises carrying out the condensation in a reaction mixture containing an inert organic liquid of high boiling point as a diluent, the quantity of liquid employed being such as to barely prevent solidification of the mass at the temperature of the reaction, diluting the reaction mass with additional liquid at the conclusion of the condensation and cooling to crystallize out the phthalone.

15. In the production of a phthalone of the quinophthalone series by the condensation of an o-phthalic anhydride with a quinaldine, the improvement which comprises performing the condensation in a reaction mixture containing a dichlorbenzol as a diluent, the quantity of dichlorbenzol employed being such as to barely prevent solidification of the mass at the temperature of the reaction.

16. In the production of a phthalone of the quinophthalone series by the condensation of an o-phthalic anhydride with a quinaldine, the improvement which comprises performing the condensation in a reaction mixture containing a dichlorbenzol as a diluent, the quantity of dichlorbenzol employed being such as to barely prevent solidification of the mass at the temperature of the reaction, and cooling to separate out the phthalone.

17. In the production of quinoline yellow base by the condensation of phthalic anhydride with quinaldine, the improvement which comprises performing the condensation in a reaction mixture containing an inert organic liquid of high boiling point as a diluent.

18. In the production of quinoline yellow base by the condensation of phthalic anhydride with quinaldine, the improvement which comprises performing the condensation in a reaction mixture containing a dichlorbenzol as a diluent.

19. In the production of quinoline yellow base by the condensation of phthalic anhydride with quinaldine, the improvement with comprises performing the condensation in a reaction mixture containing dichlorbenzol as a diluent, the quantity of dichlorbenzol employed being such as to prevent solidification of the mass at the temperature of the reaction.

20. In the production of quinoline yellow base by the condensation of phthalic anhydride with quinaldine, the improvement which comprises performing the condensation in a reaction mixture containing dichlorbenzol as a diluent, and maintaining in the reaction mixture a quantity of dichlorbenzol such as to barely prevent solidification of the mass at the temperature of the reaction.

21. In the production of quinoline yellow base by the condensation of phthalic anhydride with quinaldine, the improvement which comprises boiling a reaction mixture containing said phthalic anhydride and said quinaldine with dichlorbenzol as a diluent, removing the vapors evolved from the reaction mixture, maintaining in the reaction mixture a quantity of dichlorbenzol such as to prevent solidification of the mass at the temperature of the reaction, then cooling to separate out the resulting quinoline yellow base, and removing the quinoline yellow base from the remaining solution of impurities.

22. In the production of quinoline yellow base by the condensation of phthalic anhydride with quinaldine, the improvement which comprises performing the condensation in a reaction mixture containing commercial ortho-dichlorbenzol as a diluent, the quantity of dichlorbenzol employed being such as to barely prevent solidification of the mass at the temperature of the reaction, diluting the reaction mass with additional dichlorbenzol at the conclusion of the condensation, cooling to crystallize out the quinoline yellow base, and separating the crystallized quinoline yellow base from the remaining solution of impurities.

23. The process which comprises removing impurities from the reaction product obtained by the condensation of an o-phthalic anhydride with a member of the quinaldine series, in the form of a solution in an inert organic liquid.

24. In the purification of a quinoline yellow base, the steps which comprise treating the impure base with an inert organic liquid of high boiling point to dissolve the impurities, crystallizing out the dissolved quinoline yellow base from the resulting solution, and separating the crystallized quinoline yellow base from the remaining solution of the impurities.

25. In the production of quinoline yellow base by the condensation of phthalic anhydride with quinaldine, the improvement which comprises performing the condensation in a reaction mixture containing nitrobenzene as a diluent, the quantity of nitrobenzene employed being such as to prevent solidification of the mass at the temperature of the reaction.

26. In the production of quinoline yellow base by the condensation of phthalic anhydride with quinaldine, the improvement which comprises performing the condensation in a reaction mixture containing p-cymene as a diluent, the quantity of p-cymene employed being such as to prevent solidification of the mass at the temperature of the reaction.

27. In the purification of quinoline yellow base, the steps which comprise forming a solution of the impure base in a solvent comprising essentially dichlorbenzol, separating out the quinoline yellow base from the resulting solution, and removing the resulting purified quinoline yellow base from the remaining solution of impurities.

28. In the production of a phthalone of the quinophthalone series by the condensation of an o-phthalic anhydride with a member of the quinaldine series, the improvement which comprises separating impurities from the resulting phthalone by means of an inert organic liquid in which the phthalone is insoluble at the temperature of separation but in which the impurities are soluble at said temperature.

29. In the production of quinoline yellow base by the condensation of phthalic anhydride with quinaldine, the improvement which comprises removing impurities from the quinoline yellow base in the form of a solution in a chlorbenzene.

JAMES OGILVIE.